United States Patent [19]
Buncher

[11] 3,908,143

[45] Sept. 23, 1975

[54] ADJUSTABLE STATOR RING

[75] Inventor: Bernard R. Buncher, Pittsburgh, Pa.

[73] Assignee: Westinghouse Electric Corporation, Pittsburgh, Pa.

[22] Filed: June 24, 1974

[21] Appl. No.: 482,192

[52] U.S. Cl.................................. 310/260; 310/270
[51] Int. Cl.² .......................................... H02K 3/46
[58] Field of Search ............. 310/260, 270, 271, 43

[56] References Cited
FOREIGN PATENTS OR APPLICATIONS
1,128,540   4/1962   Germany ........................... 310/260

*Primary Examiner*—Donovan F. Duggan
*Attorney, Agent, or Firm*—G. H. Telfer

[57] ABSTRACT

An adjustable dielectric ring supports projecting end portions of a plurality of coils positioned within magnetic core slots of a dynamoelectric machine. The ring structure is provided with integral means for adjusting its circumference to establish surface-to-surface contact with the projecting end turn portions while the ring is mounted in operating position. The end turn portions are secured to the ring, thereby preventing radial and circumferential displacement.

8 Claims, 4 Drawing Figures

ADJUSTABLE STATOR RING

BACKGROUND OF THE INVENTION

1. Field of the Invention

This invention relates to dynamoelectric machines and more particularly to an adjustable ring structure for the support of stator windings of electric motors.

2. Description of the Prior Art

The simplest conception of any motor, either direct of alternating current, is that it consists of an electrical circuit interlinked with a magnetic circuit in such a way as to produce a mechanical turning force upon a rotor which is disposed for rotation within an annular stator. It is generally understood that the mechanical turning force is the result of the interaction between the magnetic field of the rotor and the magnetic field of the stator. In a machine such as the alternating current induction motor, these magnetic fields are produced by two energized coils, one carried by the rotor and one disposed in slots located about the inner circumference of the stator magnetic core.

During starting, stopping and reversal of motor rotation, and during short circuit of the stator windings, the current flowing through the stator windings is several times the value at full speed and rated load. This large current flow creates a strong magnetic field within the stator magnetic core which imparts a mechanical force on the stator windings. The magnitude of this force is proportional to the flux density of the surrounding magnetic field, the amount of current flowing through the stator windings, and the length of the conductor windings which extend through the field. Consequently, an increase in any one of these quantities will cause a corresponding increase in the force acting upon the conductor winding and will thereby tend to move it through the field.

Repetitive flexing of the end turn portions of the stator windings abrades the winding insulation which may cause the stator end windings to make electrical contact with other end windings or with the stator frame. Therefore, movement of the stator windings relative to the stator core must be limited in order to prevent a short circuit. Further, the end turn portions must be confined so that they will not interfere with the rotation of the rotor assembly.

The windings disposed in the body of the stator are held firmly within axial stator slots by wedges and are therefore adequately supported against radial and circumferential displacement. However, the end portions of these windings extend beyond the slots of the magnetic core and, depending upon their length and rigidity, must be supported against movement.

Minimal support is required in small machines, such as fractional horsepower motors, where stator winding currents are small and stator coil end turn portions are short. In such smaller motors, the rigidity of the end turns provides adequate support. In larger motors, generally above 100 horsepower, the problem of providing adequate support becomes more difficult due to the very large coil currents and powerful magnetic fields which act upon relatively long stator winding end portions.

It has been customary in prior art to employ a stator "ring" for supporting the stator winding end portions of larger motors. In a typical arrangement the stator ring is secured in operating position by stand-off braces in such a manner that its inside diameter circumscribes the outside diameter of the surface formed by the projecting end turn portions of the stator windings. Radial displacement of the stator end turn portions is thereby precluded by the restraining force presented by the rigid body of the ring, which is usually composed of an inextensible material such as metal, or glass fiber roving impregnated with a thermosetting resin. Circumferential displacement is prevented by binding each end turn portion to the ring, usually by means of fiber lashings or thermosetting resin. Such an arrangement has been described by P. Pileggi in U.S. Pat. No. 2,885,581, issued May 5, 1959.

Heretofore, metals such as steel or copper have been used in the construction of stator rings because of the rigidity and strength provided by such materials. However, metal stator rings have numerous disadvantages. From an economic viewpoint, metal rings are relatively expensive to fabricate, assemble and operate. The efficiency of a motor having a metal stator is decreased because of the heating effect of the eddy currents induced within the ring by changing flux densities. The metal ring must be insulated to prevent heat damage to the stator windings. The metal ring must also be electrically insulated to prevent a short circuit with the stator. From an assembly viewpoint, metal is difficult to shape into a circular form and is especially difficult to adjust to the proper circumference. Adjustment of prior art metal rings requires a tedious, time-consuming, trial and error procedure which involves successive steps of measuring, cutting and welding.

The use of an impregnated glass fiber roving as taught by Pileggi, supra, eliminates the undesirable eddy current losses and insulation problems. The fiberglass "rope" or roving is relatively flexible initially and thus is easily shaped to fit the contour of the projecting end turn portions. According to the method of Pileggi, the roving is impregnated immediately prior to or after installation and must be cured for a long period in order to obtain sufficient rigidity, thus delaying assembly. In addition, the circumference of the cured roving assembly is not readily adjustable; that is, it is not easily shortened or lengthened without performing the time-consuming trial and error steps of measuring, cutting and bonding. Practically speaking, once the cured roving is cut, it cannot be lengthened without sacrificing rigidity and bond strength. Furthermore, the adhesive bond for the end portion taught by Pileggi is particularly susceptible to the heat and vibration normally encountered in larger motors.

Experience in the art has indicated that a suitable structure for supporting the stator end turn portions must be sufficiently rigid to counteract the magnetic forces which are imparted thereon. Preferably, the structure should be composed of a dielectric material in order to avoid heating and short circuit problems. Moreover, the support structure should be composed of as few parts as possible with simple means for expanding or contracting its circumference. The material used should be light-weight, non-abrasive and pre-cured to facilitate assembly and installation. Furthermore, the ends of the structure should be securely joined in a manner which assures rigidity and strength but which also affords simple disassembly without destruction of the support structure or its binding means.

SUMMARY OF THE INVENTION

The present invention discloses an improved coil supporting structure for use in a dynamoelectric machine, such as an induction motor. The improvement is realized by a supporting structure which has integral means for increasing or decreasing its circumference to enclose the outside diameter of stator coil end turn portions. The supporting structure is fabricated from a dielectric material of suitable tensile strength and rigidity. The structure comprises an annular member having a unitary arc portion and bifurcated arc portion, the bifurcated arc portion having two coextensive elongated segments which are integrally formed therewith. The elongated segments are disposed parallel to one another and define an extended aperture which is centrally disposed over a small portion of the circumference of the annular member. The facing surfaces of the elongated segments are substantially planar and are parallel with one another.

The annular structure is disposed within notched portions of a plurality of bracing members which are symmetrically arranged about a stator core. The inside diameter of the annular structure is disposed so as to abut the outside diameter of the stator coil end turn portions in a circumscribing relationship. The annular structure is adapted for adjustment by severing each elongated segment near opposite ends of the extended aperture in such a manner that the facing surfaces of the elongated segments may be displaced circumferentially with respect to one another. The circumference of the annular structure is increased by moving the segments apart, and the circumference is decreased by removing an end portion of each segment and then moving the truncated segments together circumferentially with respect to each other. Once the circumference has been adjusted for surface-to-surface contact with the end turn portions, the segments are joined by a plurality of pins which are inserted through both segments to provide a compression union therewith. The end turn portions are secured to the annular structure by suitable means such as fiber lashing. The assembled annular structure is similarly fastened to each of the stand-off bracing members.

BRIEF DESCRIPTION OF THE DRAWINGS

The invention will be more fully understood from the following detailed description of the preferred embodiment, taken in connection with the accompanying drawings, in which.

DESCRIPTION OF THE PREFERRED EMBODIMENT

Figure 1:
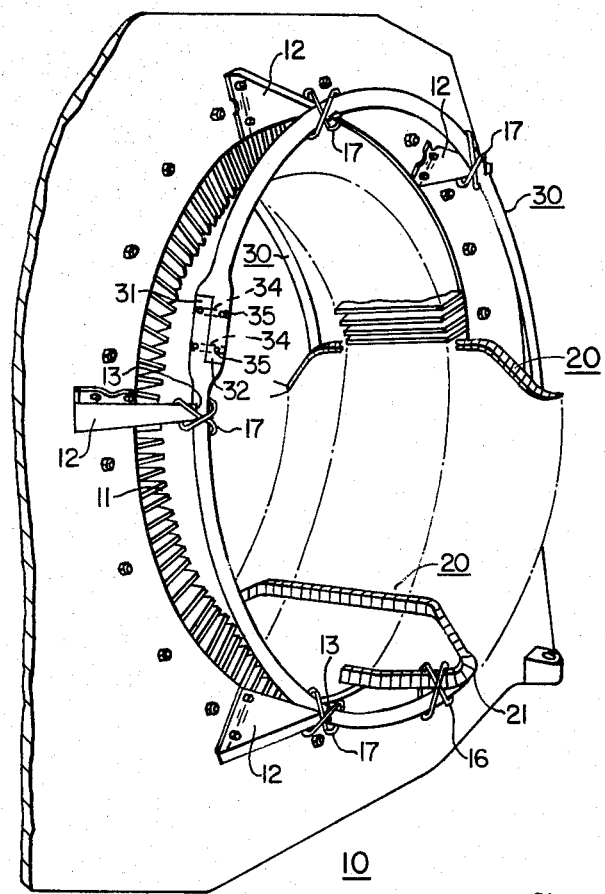
FIG. 1 is a perspective view of a partially wound stator of a dynamoelectric machine illustrating an adjustable stator ring mounted in operating position.

Throughout the following description similar reference characters refer to similar elements in all figures of the drawings.

Referring first to FIG. 1, there is shown a stator assembly 10 for a large dynamoelectric machine having the end turn portions of a plurality of stator coil windings braced and supported according to the teachings of this invention. The stator assembly 10 is fabricated of magnetic material and has a plurality of spaced winding slots 11 disposed circumferentially about the interior of the stator assembly 10. The winding slots 11 extend axially through the stator assembly 10. Inserted into the plurality of winding slots 11 is a plurality of electrical winding assemblies 20. Each winding assembly 20 has an end turn portion 21 projecting from the winding slots 11 in the stator assembly 10. The electrical winding assemblies 20 are composed of a plurality of electrical conductors which are surrounded by an insulating material.

During the operation of the dynamoelectric machine, high vibrational and magnetic forces impose great mechanical stress upon the end turn portions 21 of the winding assemblies 20. Since these forces are especially aggravated during starting, stopping, and short circuit conditions, the winding assemblies must be spaced and supported to prevent abrasive contact of one winding portion with another. In the view of the stator assembly 10 illustrated in FIG. 1, lateral bracing means (not shown) are inserted and spaced between the adjacent winding assemblies 20 to provide the necessary spacing and intermediate bracing of the winding assemblies 20.

Figure 2:
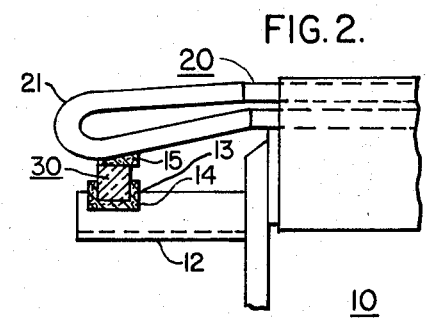
FIG. 2 is an elevation view, partly in section, of a portion of the stator of FIG. 1.

Radial and circumferential displacement of the end turn portions 21 are eliminated in the present invention by circumscribing the end turn portions 21 with an adjustable stator ring 30. Referring to FIG. 1 and FIG. 2, the adjustable stator ring 30 is disposed within a notched portion 13 of stand-off bracing members 12. A plurality of bracing members 12 are symmetrically arranged and secured to the stator assembly 10. The inside diameter of the adjustable stator ring 30 is disposed so as to abut the outside diameter of the stator winding end turn portions 21 in a surface-to-surface contact relationship. The body of adjustable stator ring 30 is nested within notched portions 13 and is cushioned against vibration by pads 14, which are preferably composed of a dacron felt such as polyethylene terephthalate. This resin impregnated material, when hardened, provides a further bracing medium in addition to the adjustable stator ring 30. A filler 15, also preferably composed of dacron felt, is inserted between end turn portion 21 and adjustable stator ring 30 to further reduce vibration and abrasion. The end turn portions 21 are secured to the adjustable stator ring 30 by suitable means such as a fiber lashing 16 as illustrated in FIG. 1.

Figure 3:
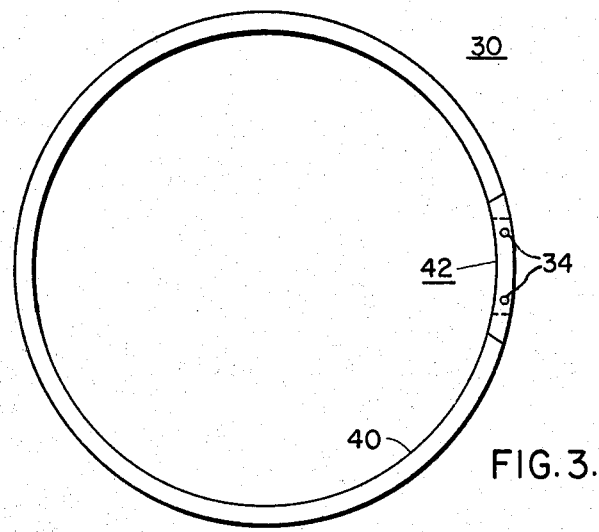
FIG. 3 is an elevation view of the annular structure of this invention.
Figure 4:
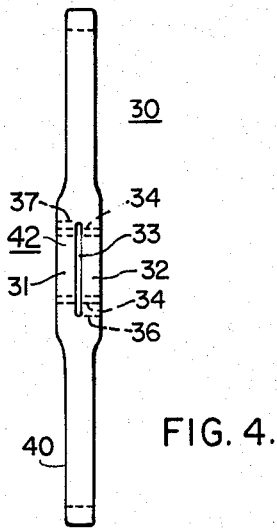
FIG. 4 is a side elevation view of the structure of FIG. 3.

Referring now to FIGS. 3 and 4, elevation views of an adjustable stator ring 30 are shown. Adjustable stator ring 30 is an annular structure fabricated from a dielectric material of suitable tensile strength and rigidity, such as polyester resin impregnated fiberglass roving. The annular structure is preferably formed and cured prior to mounting upon the stator assembly. The adjustable stator ring 30 comprises a unitary arc portion 40 and a bifurcated arc portion 42 which includes two coextensive elongated segments 31 and 32 which are integrally formed therewith. The elongated segments 31 and 32 are disposed parallel to one another and define an extended aperture 33 which is centrally disposed over a small portion of the circumference of the adjustable stator ring 30. The facing surfaces of the elongated segments 31, 32 are substantially planar and are parallel with one another.

The stator ring 30 is adapted for adjustment by severing each elongated segment 31, 32 near opposite ends of the extended aperture 33 as indicated by the dotted lines 36, 37 in FIG. 4. The facing surfaces of the elongated segments 31 and 32 may then be displaced circumferentially with respect to each other. The circumference of the adjustable stator ring 30 is increased by moving the elongated segments 31 and 32 apart from one another. The circumference is decreased by removing an end portion of each elongated segment 31 and 32 and then closing the truncated segments together.

Once the circumference of the ring 30 has been adjusted for surface-to-surface contact with the end turn portions 21, the segments 31 and 32 are joined together by a plurality of pins 35 which are registered within two or more holes 34 (shown in FIG. 1) which are drilled through elongated segments 31 and 32. The diameter of the holes 34 should be slightly smaller than the diameter of the pins 35 to insure a compression fit. For additional strength, a sealing compound such as "Lock-Tight" is applied to the pins 35. Increased mechanical strength is also provided by increasing the width of elongated segments 31 and 32 as shown in FIG. 4. The combined width of the enlarged portions including the width of aperture 33 preferably is twice the width of the remaining portion of adjustable stator ring 30.

The assembled stator ring 30 is securely fastened to the stand-off bracing members 12 by suitable means such as a fiber lashing 17 as illustrated in FIG. 1. In the event that the winding assemblies 20 must be repaired or removed for any reason, the adjustable stator ring 30 may be easily disassembled and removed from the machine merely by removing the lashings 16, 17 and by removing the pins 35 which join the elongated segments 31 and 32 together. Since the disassembly of the adjustable stator ring 30 is accomplished without destruction of the body of the ring 30 or of the binding means, the adjustable stator ring 30 may be re-used after the repair work has been completed.

It is thus apparent that this invention provides an inexpensive, easy to install, and accurate means for bracing and supporting stator coil end turn portions against radial and circumferential displacement. Since the invention employs a non-conducting dielectric material, thermal and electrical insulating problems are avoided. In addition, adjustable stator ring 30 is pre-formed and pre-cured therby facilitating assembly and installation. The unitary structure of the invention is provided with simple means for expanding or contracting its circumference to provide an exact "fit" with the stator coil end turn portions, and it is also provided with simple means for disassembly without destruction of either the support structure itself or its binding means.

I claim:

1. A device for supporting projecting end portions of a plurality of coils positioned within magnetic core slots of a dynamoelectric machine comprising:

a plurality of supporting members having notched portions, said supporting members being arranged about said magnetic core slots and being rigidly attached to said dynamoelectric machine; and an annular member having a predetermined circumference and being adapted to circumscribe said projecting coil end portions, said annular member being disposed in said notched portions, said annular member having integral means for adjusting said circumference while said annular member is disposed within said supporting members, said integral means for adjusting said circumference comprising first and second coextensive elongated segments which are disposed parallel one to another, each elongated segment being severable to allow circumferential displacement of said first elongated segment with respect to said second elongated segment, and means for mechanical connection of said first elongated segment with said second elongated segment.

2. The device of claim 1 wherein each elongated segment has a plurality of axially disposed holes therin, corresponding holes in each of said elongated segments being aligned with each other as the inner periphery of said annular member is brought into contact with the outer peripheral surfaces formed by the projecting end portions of said coils, said means for mechanical connection of said first and second elongated segments comprising a pin being disposed within said aligned holes, said pin having sufficient diameter and length to establish a compression union therewith.

3. The device of claim 1 wherein said first and second elongated segments are of greater width than said annular member thereby providing increased mechanical strength for the union of said first and second elongated segments.

4. An adjustable stator ring for supporting axially extending end turn portions of a plurality of coils positioned within magnetic core slots of a dynamoelectric machine comprising a unitary arc portion and a bifurcated arc portion, said unitary portion being joined end-to-end with said bifurcated portion forming a closed annular structure of predetermined circumference, the arc length of said bifurcated portion being small in relation to the arc length of said unitary portion; said bifurcated portion comprising first and second coextensive elongated segments, said segments being disposed parallel one to another and extending circumferentially therein, each elongated segment being severable to allow circumferential displacement of said first elongated segment with respect to said second elongated segment.

5. The stator ring of claim 4 wherein a portion of said first elongated segment is removed and a portion of said second elongated segment is removed, the circumference of said stator ring being decreased as the remaining portions of said elongated segments are closed together circumferentially with respect to each other and increased as the remaining portions are opened circumferentially with respect to each other, and means binding said remaining elongated segment portions rigidly together.

6. The stator ring of claim 4 wherein the combined cross-sectional area of said first and second elongated segments is greater than the cross-sectional area of said unitary portion, thereby providing increased mechanical strength for the union of said first and second elongated segments.

7. The stator ring of claim 5, each elongated segment having at least one hole axially disposed therein, corresponding holes in each elongated segment being aligned with each other as the inner periphery of said stator ring is brought into contact with the outer peripheral surfaces of said projecting coil end portions, and pins engaging said aligned holes in a compressive union therewith thereby connecting said segments together.

8. The stator ring of claim 5 in combination with a plurality of supporting members, said supporting members being spaced around said projecting coil end portions and rigidly attached to said dynamoelectric machine, said supporting members having notched portions within which said stator ring is disposed, and means securing said stator ring to said supporting members.

\* \* \* \* \*